United States Patent [19]

Watanabe et al.

[11] Patent Number: 5,757,290
[45] Date of Patent: May 26, 1998

[54] APPARATUS AND METHOD FOR NAVIGATING MOBILE BODY USING BIRD'S EYE VIEW

[75] Inventors: Masaki Watanabe; Norimasa Kishi, both of Yokohama, Japan

[73] Assignee: Nissan Motor Co., Ltd., Yokohama, Japan

[21] Appl. No.: 634,878

[22] Filed: Apr. 19, 1996

[30] Foreign Application Priority Data

Apr. 19, 1995 [JP] Japan .................................. 7-093704

[51] Int. Cl.$^6$ .................................................. G03G 1/123
[52] U.S. Cl. ........................... 340/995; 340/990; 340/988; 364/444; 364/449
[58] Field of Search .......................... 340/995, 990, 340/988, 973, 974, 975; 364/449, 443, 444; 345/133, 139

[56] References Cited

U.S. PATENT DOCUMENTS

| | | | |
|---|---|---|---|
| 3,309,659 | 3/1967 | Balding | 340/977 |
| 3,521,227 | 7/1970 | Congleton et al. | 340/973 |
| 3,521,228 | 7/1970 | Congleton et al. | 340/973 |
| 4,247,843 | 1/1981 | Miller et al. | 340/973 |
| 4,283,705 | 8/1981 | James et al. | 340/973 |
| 5,161,886 | 11/1992 | De Jong et al. | 364/449 |
| 5,420,582 | 5/1995 | Kubbat et al. | 340/974 |
| 5,566,073 | 10/1996 | Margolin | 364/449 |

*Primary Examiner*—Jeffery A. Hofsass
*Assistant Examiner*—Benjamin C. Lee
*Attorney, Agent, or Firm*—Foley & Lardner

[57] ABSTRACT

In apparatus and method for navigating a mobile body (.e.g., an automotive vehicle) through an image display unit using a bird's eye view representation, display colors of individual objects in a road map information of a region to be displayed using the bird's eye view in a road map information of a plurality of road map pieces stored in an external memory unit are varied on the basis of distances from the individual elements (objects) to a viewpoint of the bird's eye view so as to express atmospheric effects in an actual landscape. In addition, various types of external environmental information such as a weather condition information and a traffic congestion information are added into the bird's eye view representation, avoiding a complication in the displayed image screen of the image display unit.

20 Claims, 9 Drawing Sheets

5,757,290

APPARATUS AND METHOD FOR NAVIGATING MOBILE BODY USING BIRD'S EYE VIEW

BACKGROUND OF THE INVENTION

The present invention relates to an apparatus for navigating a mobile body using a bird's eye view and a method therefor in which display colors of individual elements (objects to be displayed) in road map information to be displayed in the form of the bird's eye view are varied according to distances from the individual elements to a viewpoint of the bird's eye view so as to represent an atmospheric effect(s) in an actual landscape from a pseudo point of view (in a pseudo manner) and in which various kinds of required information are produced to a user so as to be viewed approximately three-dimensionally, thus the data of the objects in the road map information being easily grasped by a user.

A U.S. patent application Ser. No. 08/362,647 filed on Dec. 23, 1994 exemplifies previously proposed apparatus and method for navigating a vehicle to a set destination using an image display unit.

In the previously proposed vehicular navigating apparatus and method, road map storing means (external memory unit) is provided for storing a road map data related to the road map; vehicle position detecting means is provided for detecting a present position of the vehicle; start point setting means is provided for setting a start point of location on the road map at which the vehicle is to start on the basis of the detected present position of the vehicle; route of travel setting means is provided for setting a route of travel on the road map from the start position to the set destination; and the display control means is provided for controlling an image of the road map surrounding the set route of travel to be displayed on a display image screen of the display unit, the image of the road map surrounding the set route of travel to be displayed on the display unit being taken in a form of a desired bird's eye view achieved when the bird's eye as a viewpoint is placed at a predetermined position on an upper sky located in a direction opposite to the set destination with the present position of the vehicle as a reference and the road map surrounding the set route of travel being looked down over from the bird's eye viewpoint.

A U.S. patent application Ser. No. 08/384,715 filed on Feb. 3, 1995 exemplifies other previously proposed portable or vehicular navigating apparatus and method capable of displaying the bird's eye view.

However, there are still industrial demands as will be described below.

For example, since, in the previously proposed navigating system (apparatus and method), an object present on the road map data to be displayed is displayed in the same color if one of the objects to be displayed is the same object, the objects to be displayed including a road map data having an extent (width), to some degree, stretched in a plane such as a plurality of road links representing the same route or such a polygon representing a river system or building, so that a stage effect (a representation result) in a sense of providing a feeling of distances for a viewer (user) by means of the bird's eye view representation is weakened and the user (viewer) views the image screen with no feeling of depth (approximately three-dimensional representation) in the bird's eye view representation, it is desired that the navigation apparatus and method are designed to strengthen the stage effect (representation result) in the sense of distances and the the user views the image screen with the feeling of depth (approximately three-dimensionally).

In addition, it is desired that the navigating apparatus and method are so designed as to display various types of external environmental information such as a weather information or traffic congested (stagnation) information without complication of the displayed data.

SUMMARY OF THE INVENTION

With the above-described industrial demands in mind, it is an object of the present invention to provide improved apparatus and method for navigating a mobile body using a bird's eye view in which display colors for individual elements (objects) to be displayed on an image screen of the image display unit are varied according to distances from a viewpoint of the bird's eye view to positions of the respective elements (objects) on a road map data so that a situation such that a long-distant landscape (sight) were viewed with a mist due to an atmospheric effect when the user (viewer of the image screen of the image display unit) views an actual landscape (sight) is reproduced in a pseudo manner, thus strengthening a stage effect (representation result) in a sense of distances (providing the feeling of distances for the user) and the user visually grasping the sense of distances (approximately three-dimensionally).

It is another object of the present invention to provide the apparatus and method for navigating the mobile body using the bird's eye view in which a method for partially realizing the atmospheric effect on the image screen of the image display unit is varied under a predetermined condition or not activated so that various types of external environmental information such as a weather condition information, a traffic congestion (stagnation) information can visually be represented and so that the complication of the displayed data due to the increase in the display data quantity can be prevented.

The above-described objects can be achieved by providing an apparatus for navigating a mobile body, comprising:

a) an external memory unit arranged for storing road map information on each of a plurality of road map pieces;

b) a display reference point determining unit arranged for determining a display reference point on the basis of which a region in prices of the road map stored in the external memory unit is determined to be displayed on an image screen;

c) an arithmetic processing unit arranged for carrying out an arithmetic operation and processing required to display any pieces of the road map which corresponds to the region determined to be displayed on the image screen in a form of a bird's eye view; and d) an image display unit arranged for displaying the region in pieces of the road map stored in the external memory unit to be determined to be displayed on the image screen thereof in the form of the bird's eye view, wherein said arithmetic operation and processing unit comprises:

e) first determining means for determining the region in pieces of the road map stored in the external memory unit to be displayed on the image screen on the basis of the determined display reference point and for determining coordinate transformation parameters to be used for a perspective projection transformation of the region of pieces of the road map into the bird's eye view on the basis of the determined display reference point;

f) road map data inputting means for reading the road map information of the region of pieces of the road map to be displayed from the external memory unit into said arithmetic processing unit;

g) coordinate transforming means for carrying out the perspective projection coordinate transformation for the road map information on the corresponding region to be displayed using the coordinate transformation parameters determined by said first determining means;

h) internal memory means for storing mixing ratios (w) of colors to be displayed with other additive colors and the other additive colors ($V_{CA}$) to be mixed with the colors to be displayed for individual pixels constituting the displayed image screen on said image display unit, said mixing ratios (w) and the other additive colors ($V_{CA}$) being parameters to vary display colors of data of objects in said road map information of the corresponding region of the road map according to distances from a viewpoint of the bird's eye view to the respective objects to be displayed;

i) second determining means for determining the respective display colors for the respective data of objects in said road map information on the corresponding region of the road map to be displayed on the image screen of said image display unit after the perspective projection coordinate transformation using the display color mixing ratios (w) and the other additive colors ($V_{CA}$) to be mixed with the colors to be displayed; and j) display color outputting means for outputting the respective display colors for the respective data of the objects in the region of the road map to be displayed on the image screen of said display unit determined by said second determining means to the image display unit together with the coordinate transformed road map information of the corresponding region of the road map to be displayed.

The above-described objects can also be achieved by providing a method for navigating a mobile body using an image display unit comprising the steps of:

a) storing road map information on each of a plurality of road map pieces;

b) determining a display reference point on the basis of which a region in prices of the road map stored at said step a) is determined to be displayed on an image screen of said image display unit;

c) carrying out an arithmetic operation and process required to display any pieces of the road map which corresponds to the region determined to be displayed on the image screen in a form of a bird's eye view; and d) displaying the region in pieces of the road map stored at said step a) to be determined to be displayed on the image screen of said image display unit in the form of the bird's eye view, wherein said step c) further comprises the steps of:

e) determining the region in pieces of the road map stored at said step a) to be displayed on the image screen on the basis of the determined display reference point and determining coordinate transformation parameters to be used for a perspective projection transformation of the region of pieces of the road map into the bird's eye view on the basis of the determined display reference point;

f) reading the road map information of the region of pieces of the road map to be displayed;

g) carrying out the perspective projection coordinate transformation for the road map information on the region to be displayed using the coordinate transformation parameters determined at said step e);

h) storing mixing ratios (w) of colors to be displayed with other additive colors and the other additive colors ($V_{CA}$) to be mixed with the colors to be displayed for individual pixels constituting the displayed image screen on said image display unit, said mixing ratios (w) and the other additive colors ($V_{CA}$) being parameters to vary display colors of data of objects in said road map information of the corresponding region of the road map according to distances from a viewpoint of the bird's eye view to the respective objects to be displayed;

i) determining the respective display colors for the respective data of the objects in said road map information on the corresponding region of the road maps to be displayed on the image screen of said image display unit after the perspective projection coordinate transformation using the display color mixing ratios (w) and the other additive colors ($V_{CA}$) to be mixed with the colors to be displayed; and j) outputting the respective display colors for the respective data of the objects in the corresponding region of the road map to be displayed on the image screen of said display unit determined at said step e) to the image display unit together with the coordinate transformed road map information of the corresponding region of the road map to be displayed.

BEST MODE FOR CARRYING OUT THE INVENTION

Reference will hereinafter be made to the drawings in order to facilitate a better understanding of the present invention.

Figure 1:
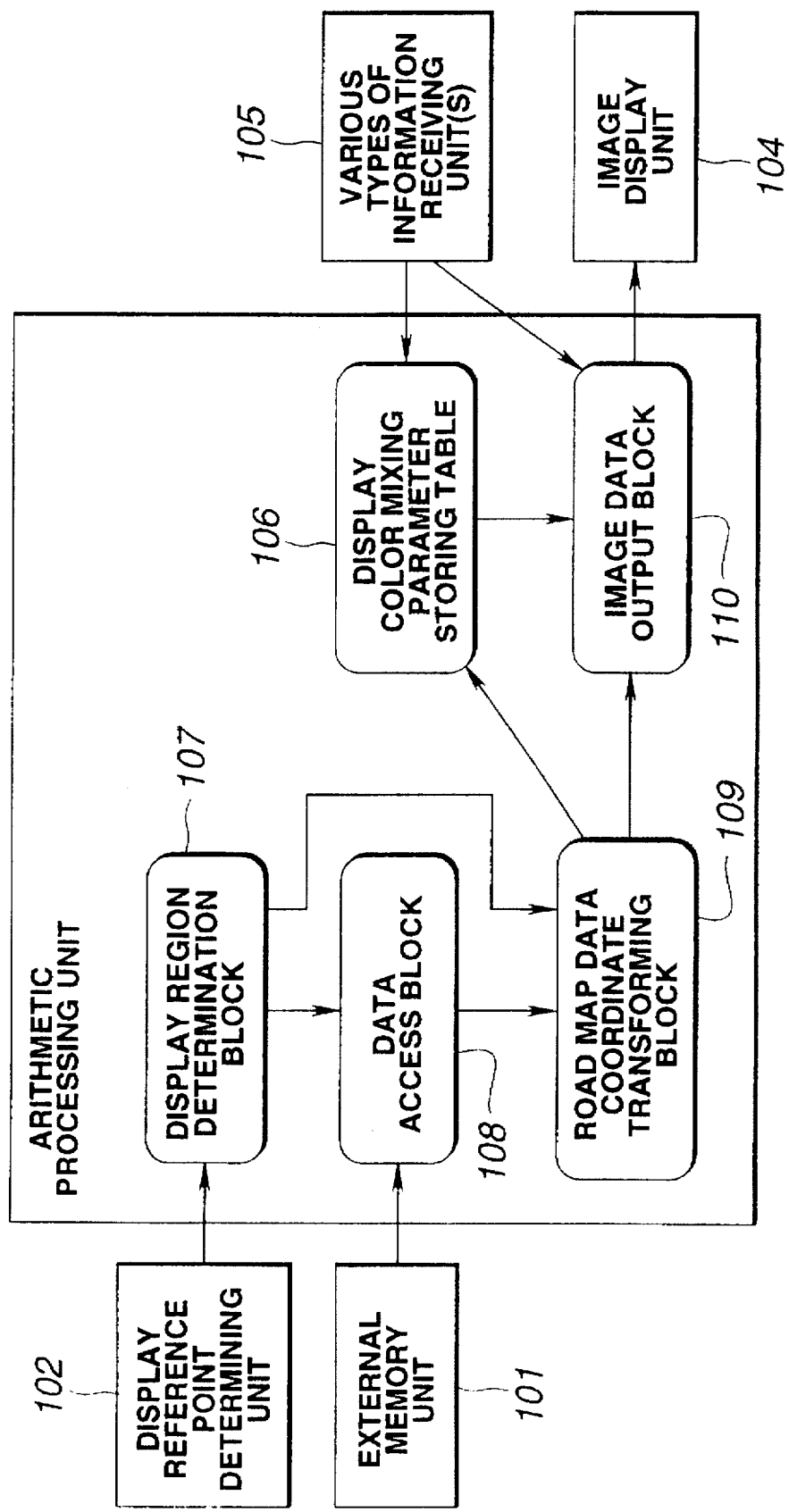
FIG. 1 is a circuit block diagram of a navigating apparatus in a first preferred embodiment according to the present invention.

FIG. 1 shows a circuit block diagram of a navigating apparatus for a mobile body in a first preferred embodiment according to the present invention.

In the navigating apparatus in the first embodiment, the mobile body corresponds to an automotive vehicle.

The navigating apparatus shown in FIG. 1 includes: an external storage (memory) unit 101 which stores a road map information (data) on each of a plurality of road map pieces; a display reference point determining unit 102 which determines a display reference point on a road map; an arithmetic processing unit 103 which carries out an arithmetic processing required to display a bird's eye view; an image display unit 104 which caries out a road map image display on its image screen; and various types of information receiving unit(s) 105 (also, called external environmental information inputting means) which receives a dynamic external environmental information such as a congested traffic information from external infrastructure facilities.

The arithmetic processing unit 103 includes: a) a display color mixing parameter storing table 106 which stores display color mixing parameters (display color mixing ratios and other additive colors to be mixed with colors to be displayed) to vary the displayed colors of the data of objects to be displayed in the road map information according to distances from the displayed points of places in the display colors to a viewpoint of the bird's eye view for respective pixels on the image screen of the image display unit 104; b) a display region determination block 107 which determines a region of prices of the road map to be displayed on the image screen of the image display unit 104 and determines coordinate transformation parameters on the basis of the display reference point determined by the display reference point determining unit 102; c) a data access block 108 which receives the road map information (data) of the region to be displayed from the external memory unit 101; d) a road map data coordinate transforming block 109 which carries out a perspective projection transformation for the road map region to be displayed of the road maps; and e) image data output block 110 which determines the display colors of the respective data to be displayed from among the road map data after the perspective projection transformation by the road map data coordinate transforming block 109 using the display color mixing parameters stored in the display color mixing parameter storing table 106 and using the external environmental information inputted through the various types of (environmental) information receiving unit(s) 105 and outputs the determined display colors and the data of the road map region to be displayed to the image display unit 104.

It is noted that the image display unit 104 is, for example, constituted by a full color liquid crystal display, the external memory unit 101 is, for example, constituted by a CD (Compact Disc)-ROM and a CD-ROM drive, the arithmetic processing unit 103 is, for example, constituted by a microcomputer having a CPU (Central Processing Unit), ROM (Read Only Memory), RAM (Random Access Memory), I/O port, a common bus, and V (Video)-RAM, and if the navigating apparatus does not execute an atmospheric effect display function based on the external environmental information from the various types of information receiving unit(s) 105, the various types of information receiving unit(s) 105 may be omitted from FIG. 1.

The navigating apparatus shown in FIG. 1 carries out the following operations: (1) a processing flow of the bird's eye view display (representation); (2) setting of display color mixing parameters; and (3) a processing flow of the display color determination.

Therefore, detailed explanations of the above-described processing operations will be made hereinafter with reference to FIGS. 1 to 9.

Figure 2:
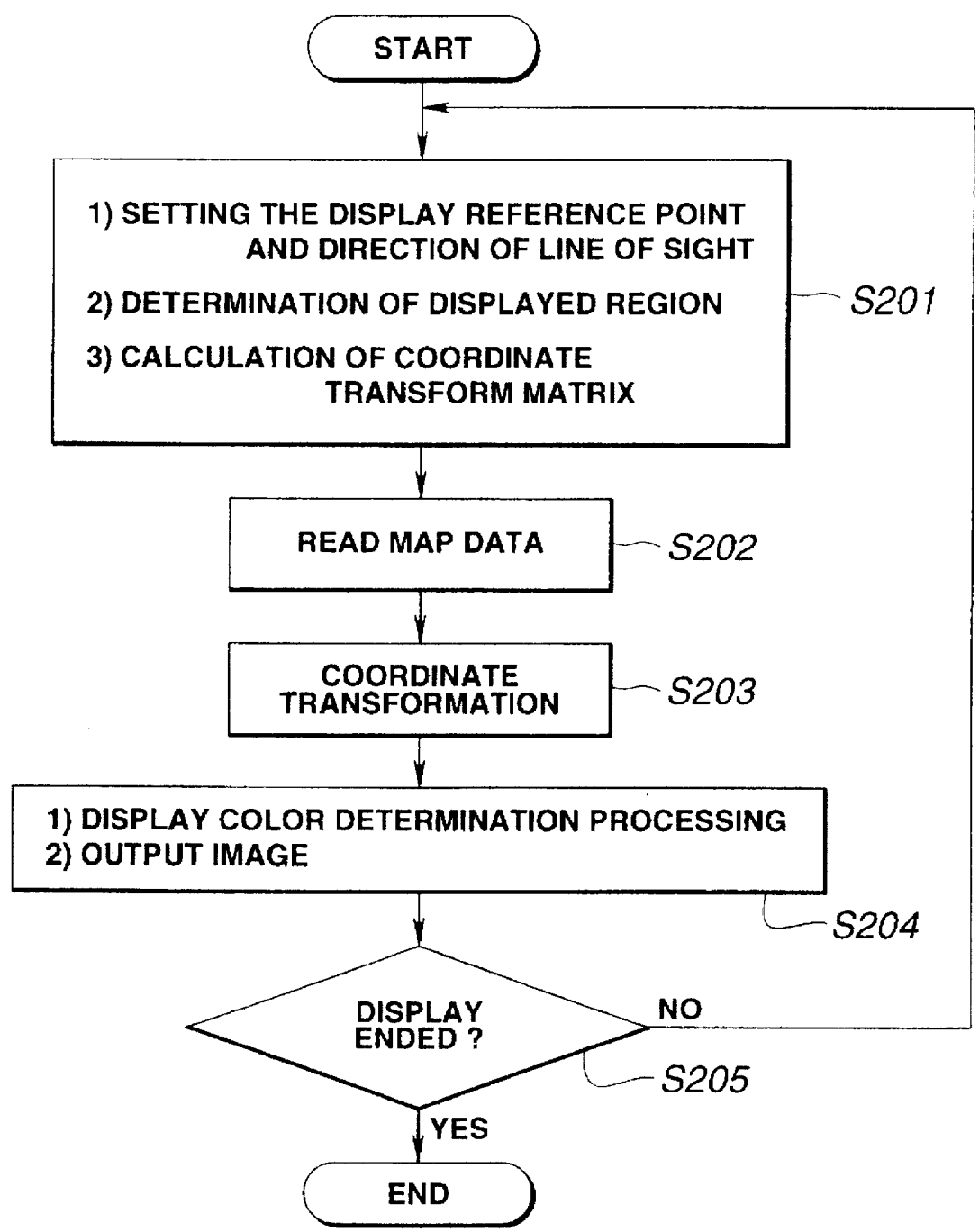
FIG. 2 is a processing flowchart for explaining an operation of an arithmetic processing unit of the navigating apparatus shown in FIG. 1.

(1) Processing flow of the bird's eye view display (representation):

FIG. 2 shows an operational flowchart executed by the arithmetic processing unit 103 whenever a predetermined control period of time has passed.

At a step S201, the unit 103, namely, the display region determining unit 107 sets the display reference point and a direction of line of sight in accordance with an output information from the display reference point determining unit 102, determines a region on a road map (plane) which is a displayed object (the region of the road map to be displayed), and calculates coordinate transformation matrices (coordinate transformation parameters) required to transform the region of the road map data to be displayed into the perspective projection representation.

Figure 9:
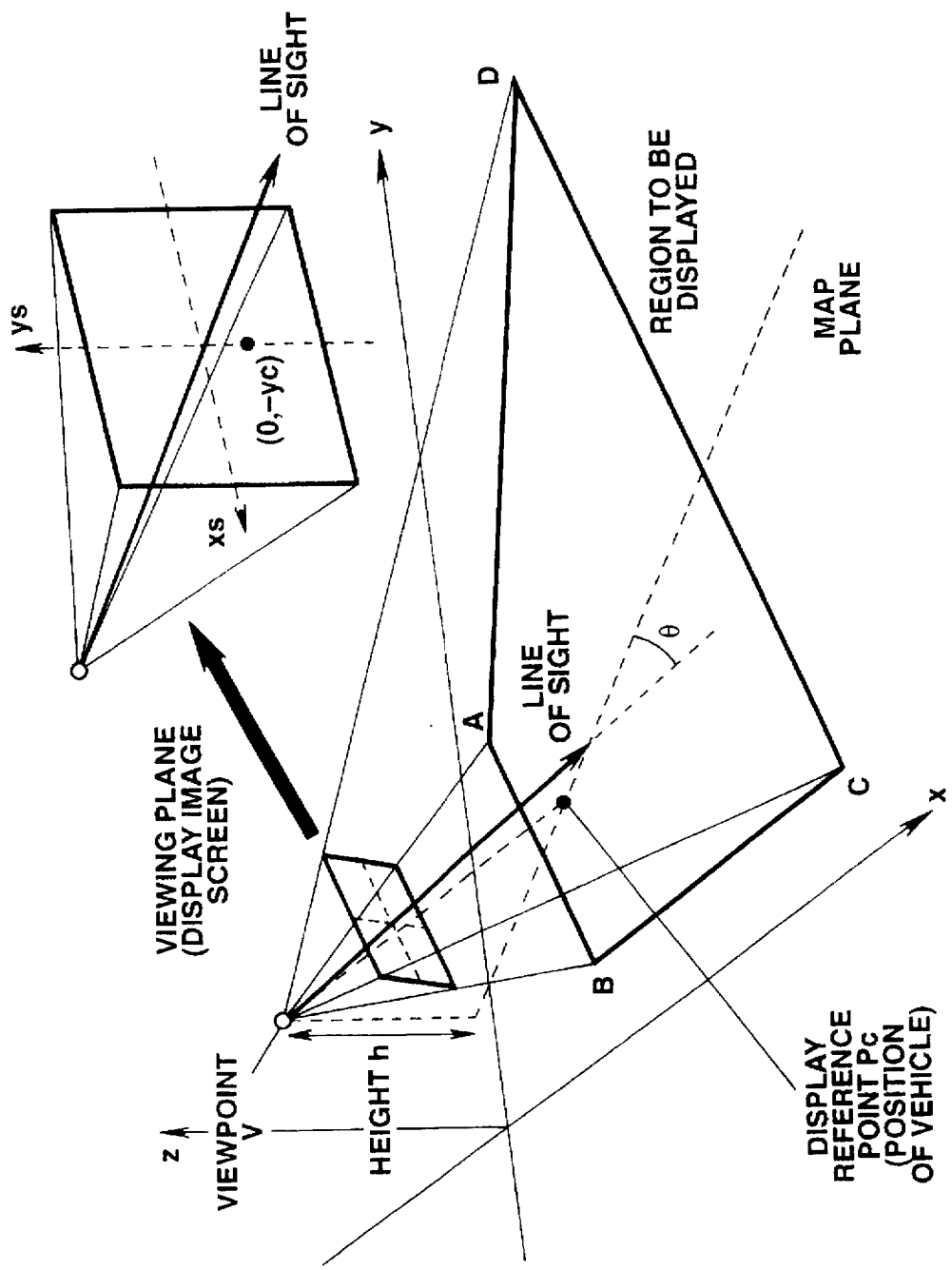
FIG. 9 is an explanatory view for explaining relationships between the viewpoint, a line of sight, a display image screen, area (a region in piece(s) of road map to be displayed) to be displayed, and a display reference point in the case of the bird's eye view.

FIG. 9 shows an explanatory view for explaining the display reference point and the direction of line of sight in the case of the bird's eye view representation.

In FIG. 9, the region to be displayed in the road map information of pieces of the road map is formed by a trapezoid having equal legs ABCD shown in FIG. 9 in the case of the bird's eye view representation. Suppose that the road map information is defined on an x-y plane within a three-dimensional orthogonal coordinate system (x, y, z) and a viewpoint V is placed at an upper part above the map plane (x-y coordinate) by a height denoted by h and looks down the ground through a dip angle denoted by θ. It is noted that the height h and the dip angle of θ may be varied properly according to their necessities but, in this case, are fixed values for simplification and convenience purposes.

The display image screen (viewing plane) is placed against the line of sight so as to be vertical with respect to the line of sight. In the display image screen, a two-dimensional plane coordinate system (xs, ys) describing a position on the image screen is defined as shown in FIG. 9. Since it is a general practice in the navigating apparatus to display the road map which is adjacent to a present position of the mobile body (vehicle) in which the navigating apparatus is mounted, a position of the region to be displayed (displayed object) needs to be determined so that, for example, the present position of the vehicle denoted by Pc in FIG. 9 is always displayed on a point of the image screen denoted by (0, -yc). Alternatively, the point Pc may be one of points of places previously registered by a user so that its adjacent road map data about the registered point may be displayed when a calling operation is carried out by the user for the registered point of place. In either case, it is necessary to coincide the fixed point (0, -yc) on the image screen with either the present position of the vehicle or the registered or called point of place. Thus, the point of the road map (plane) which corresponds to (represents) the fixed point on the image screen is called the display reference point. It is noted that the display reference point determining unit 102 is onstituted by, for example, GPS (Global Positioning System) sensor which measures and outputs the present position of the vehicle from electromagnetic waves of a plurality of satellites.

In order to determine the region to be displayed in pieces of the road map, it is also necessary to determine to which direction the line of sight on the x-y plane is directed, i.e., to determine an angle of a symmetrical axis of the trapezoid ABCD intersected with the x axis or y axis, in addition to the display reference point. The display reference point determining unit 102 outputs the direction of the line of sight in the form of, for example, the present forwarding direction of the vehicle to the display region determining block 107.

Next, at a step S202, the data access block 108 reads the road map data (information) required in accordance with the determined displayed area (region) at the step S201 from the external memory unit 101. It is noted that, at the present step of S202, if the road map data used at a previous routine of FIG. 2 is already stored internally in the arithmetic processing unit 103 and these road map data stored can be used at the present routine of FIG. 2, it is not necessary to read the same road map data again.

At the next step S203, the road map data coordinate transforming block 109 carries out the perspective projection transformation for the road map data (information) read at the step S202 (or stored internally in the arithmetic processing unit 103) by means of the determined coordinate transformation matrices (parameters).

At a step S204, the image data output block 110 carries out a clipping for the coordinate transformed individual road map data according to its necessity, determines the display colors for the data to be displayed on the basis of the display color mixing parameters, and outputs the data to be displayed and the display colors to the image display unit 104.

At the next step S205, the arithmetic processing unit 103 determines whether the present display operation is to be ended. If the present display operation is not to be ended (NO) at the step S205, the routine returns to the step S201 to repeat the above-described display processing. If the present display operation is to be ended (YES) at the step S205, the present routine of FIG. 2 is ended.

(2) Setting of the display color mixing parameters:

Next, the display color mixing parameter storing table 106 sets the display color mixing parameters as follows:

The display color mixing parameters are parameters to vary the display colors of the data of objects in the road map information to be displayed according to distances from the viewpoint to the respective data of objects in the road map information to be displayed for the respective pixels on the image screen of the image display unit 104.

The display color mixing parameters are constituted by two parameters of display color mixing ratios (ratios of colors to be displayed to be mixed with with other additive colors) and of the other additive colors to be mixed with the colors to be displayed.

Each display color on the image screen of the image display unit 104 is specified by, for example, three groups of parameters $C_R$, $C_G$, and $C_B$ which are strengths of red component, green component, and blue component represented by integers from zero to 255 ($2^8-1$) or by a vector $Vc=(C_R, C_G, C_B)$ of these color components. The red, green, and blue are primaries.

It is noted that for the individual road map region data, the display colors are previously specified in the road map data stored in the external memory unit 101. These previously specified display colors are called natural colors (also called, original colors) which are expressed by $V_{CO}=(C_{RO}, C_{BO}, C_{BO})$.

On the other hand, the atmospheric effect is a phenomenon such that aerial molecules and/or floating particles in the air present between the viewpoint and a particular object (element) scatter or absorb light so that as the particular object becomes far away from the viewpoint, the natural color of the corresponding object is faded out. Theoretically, if the object is present at an infinitely remote position (the infinite point) ∞, the natural (original) color that the object naturally has is completely faded out so that such an assumption that the whole air looks gray may be made.

As a method of reproducing the atmospheric effect from a pseudo point of view (in a pseudo manner) through CG (computer graphics), a real number value denoted by w is defined according to the distance from the viewpoint of the bird's eye view (refer to FIG. 9) to the object and a weight mean between the natural color $V_{CO}$ and the color of the air at the infinitely remote place $V_{CA}=(C_{RA}, C_{GA}, C_{BA})$ is taken (calculated) with w as a weight mean coefficient to determine the corresponding display color $V_{CD}=(C_{RD}, C_{GD}, C_{BD})$.

That is to say, the display color $V_{CD}$ is determined according to an equation (1) shown in TABLE 1.

In the first embodiment, w represents the display color mixing ratio and $V_{CA}$ represents the other additive color to be mixed with the (original) color to be displayed. Both of w (display color mixing ratio) and $V_{CA}$ (the other additive color to be mixed with the color to be displayed) are integrally called display color mixing parameters.

Next, values of these display color mixing parameters are determined in the following way.

As described above, the display color mixing ratio w is a function of the distance from the viewpoint to the object to be displayed. The coordinate values of the point of view is derived at the step S201 of FIG. 2 which is the routine of picture drawing procedure by the display region determining block 107. In addition, since the road map information which is the region data to be displayed have their own positional coordinates, the actual distances from the viewpoint to the respective objects to be displayed can be determined basically by deriving absolute values of difference vectors between both corresponding coordinate values.

However, since this method requires a tremendous amount of calculations for determining the actual distances whenever the routine shown in FIG. 2 is executed, the display positions on the image screen (namely, the positions of the respective pixels) may indirectly represent these actual distances and, in the first embodiment, the display color mixing ratio w is given to each of the pixels on the image screen on the basis of the above-described display position assumption.

Figure 3:
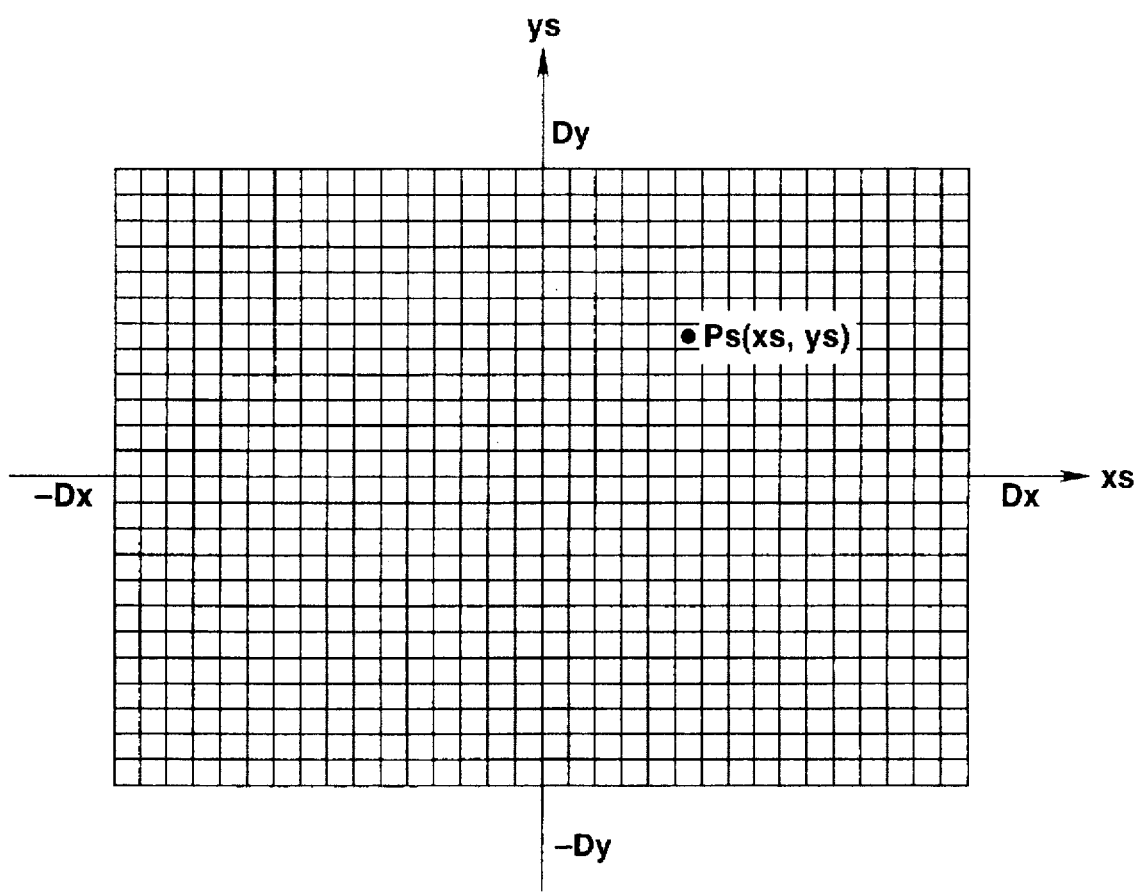
FIG. 3 is an explanatory view for explaining a pixel arrangement on an image screen of an image display unit and a coordinate system adopted in the image screen of the image display unit shown in FIG. 1.

The display image screen is constituted by a multiple number of pixels, as shown in FIG. 3.

As appreciated from FIG. 3, one display color is given to each of the pixels and, as a whole, one sheet of image is formed on the image screen. Hence, the calculation shown in the equation (1) is repeated for each pixel so that the atmospheric effect can be represented on the image screen. Suppose that the two dimensional coordinates of a lateral axis of xs and of a longitudinal axis of ys are defined to specify the display positions on the image screen (positions of the pixels) and a point on which the line of sight intersects with the image screen is defined as an origin of the two dimensional coordinates. For simplification purpose, the center of the image screen is the origin and a drawing range in the image screen is defined as $-Dx \geq xs \leq Dx$, $-Dy \leq ys \leq Dy$.

In order to determine the display color on an arbitrary point Ps (xs, ys) on the image screen, a point P on the road map corresponding to the point Ps is derived so that the display color mixing ratio w is determined on the basis of the actual distance from the viewpoint to the point P. However, in the first embodiment, in order to simplify the calculation, the same display color mixing ratio w for the pixels aligned in each lateral row on the image screen is approximated as the display color mixing ratio therefor. That is to say, w is a function defined only by ys irrespective of xs and is determined according to the actual distance from the viewpoint to the point on the road map corresponding to the point (0, ys).

Figure 4:
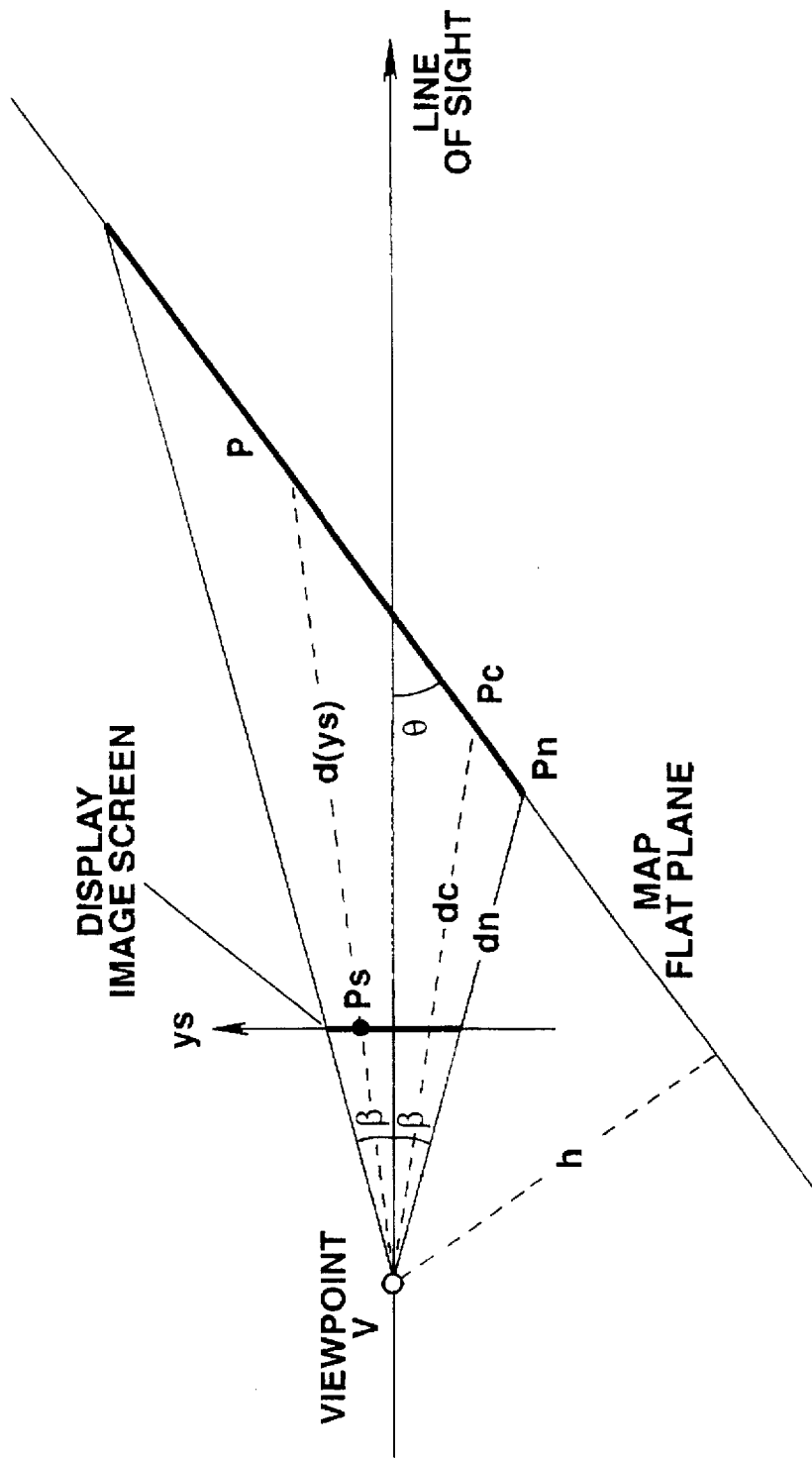
FIG. 4 is an explanatory view for explaining a method for determining a distance from a viewpoint of a bird's eye view to a point on a map plane corresponding to a point of the image screen.

FIG. 4 shows an explanatory view of relationships between the viewpoint V, line of sight, the display image screen, and the road map plane viewed from the lateral axis xs of the image screen.

As shown in FIG. 4, if the point P on the road map corresponding to the point Ps on the image screen to which the value of ys is given is present on the road map plane, the distance d between the viewpoint V and the point P is given to an equation of (2) of TABLE 1.

In the equation (2), h denotes the height of the viewpoint V from the road map plane, $\theta$ denotes the dip angle of the line of sight, $\beta$ denotes an angle of field of view in the longitudinal direction viewing from the viewpoint V to the image screen (a single direction), Dy denotes a maximum value in the longitudinal coordinate of the image screen, and all of these parameters are supposed to be constants.

In order to determine the value of the display color mixing ratio w on the basis of the distance d, the distance dn from the viewpoint V to a nearest point Pn to the viewpoint V (a point corresponding to the lowest end of the image screen) in the field of view displayed on the image screen is derived. Specifically, ys=−Dy is substituted into the equation (2) to derive an equation (3) in TABLE 1.

The display color mixing ratio w may be an arbitrary function which is monotonously reduced along with an increase in the distance d. In the first embodiment, the display color mixing ratio w is defined as an exponential function such that if the distance d is infinite ($\infty$), the display color mixing ratio w is converged to zero.

In addition, since theoretically the atmospheric effect appears if d>0, the display color mixing ratio w needs to be determined so that if d=0, w=1 (displaying the natural color) in order to reproduce the atmospheric effect. However, from a standpoint of an easiness in recognizing the displayed content in the navigating apparatus, it is sufficient to perform the atmospheric effect in the pseudo manner within a displayed, limited region rather than a forceful reduction of a saturation of the display color.

Hence, in the first embodiment, the display color mixing ratio w is defined in an equation (4) of TABLE 1 so as to give w=1 if d=dn.

It is noted that, in the equation (4), a denotes a positive real number constant to determine a variation rate of w to d and its value of a is previously set according to a proper equation.

The surrounding part of the display reference point Pc which determines the position of the region of the road map to be displayed is a part at which a most detailed road map information is desirably obtained for the user of the navigating apparatus for navigating the mobile body (vehicle) using the bird's eye view representation so that a designer of the navigating apparatus desires to avoid the reduction of saturation of the display color at this surrounding part due to the representation of the atmospheric effect. In this case, for example, on a region of the road map to be displayed which is nearer to the viewpoint V than the point Pc, w may be set to 1 to display the natural color and on another region of the road map to be displayed which is more far way (more remote) from the viewpoint V, the atmospheric effect may be represented.

In this alternative case, suppose that the coordinates of the point on the image screen corresponding to the point Pc are (0, −yc). Then, the distance dc from the viewpoint V to the point Pc is expressed in an equation (5) of TABLE 1.

Hence, the definition equation of w may be shown in an equation of (6) of TABLE 1 in place of the equation (4).

In other words, by a combination of the equations (2), (3), and (4) or by another combination of the equations (2), (5), and (6), the display color mixing ratio w can be determined for each different ys of each pixel. Hence, the combinations of the equations are calculated before the navigating apparatus executes the picture drawing procedure of FIG. 2 or these results of calculations as the fixed values are previously stored in the display color mixing parameter storing table 106 shown in FIG. 1.

Figure 5:
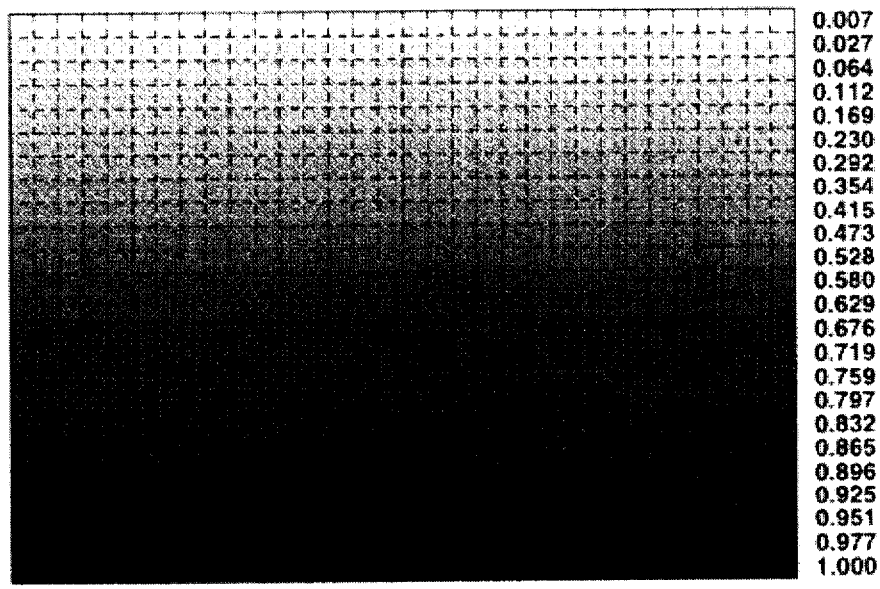
FIG. 5 is an explanatory view for explaining a storing pattern of display color mixing ratios (w) stored in a display color mixing parameter storing table of an internal memory shown in FIG. 1.

FIG. 5 shows graphically a storing pattern of the display color mixing ratios w stored in the display color mixing parameter storing table 106.

For the other display color mixing parameter, i.e., the other additive color to be mixed with the color to be displayed denoted by $V_{CA}$, for example, the gray color defined as $V_{CA}$=(100, 100, 100) may uniformly be used.

In this case, an influence of the atmospheric effect appears uniformly in any part of an image screen.

However, for example, in a case where, for example, such an information that rain is falling on a regional area corresponding to a right upper part of the image screen is received from the various types of information receiving unit(s) 105 (a communication equipment in the vehicle to receive an external environment information from one of external infrastructure facilities), the other additive color to be mixed with the color to be displayed denoted by $V_{CA}$ is set to a rather (relatively) dark color for the corresponding part of the image screen so that the regional area described above may be represented in a darker color tone (color tone may be translated as Farbton in German) than the other regional area.

Furthermore, in a case where a photo-chemical smog alert is being issued at some regional area on the map, the other additive color to be mixed with the color to be displayed $V_{CA}$ with a slight yellow color is set to the corresponding divided display regions of the image screen so that the information of the photo-chemical smog alert can visually and symbolically be represented.

In addition, in a case where the destination which the user of the navigating apparatus has set as the vehicle to finally arrive at is present in a direction of a left-handed portion as viewed from the user toward the image screen, a (relatively) brighter color(s) is set for ⅓ left-handed portion of the image screen so that the direction of the destination can visually and distinctively be represented.

In order to represent attribute information (property information) related to some regional area (local area) utilizing the atmospheric effect representation, the value of the other additive color to be mixed with the color to be displayed $V_{CA}$ may be determined for each pixel on the image screen and may be stored in the display color mixing parameter storing table 106.

That is to say, the value of $V_{CA}$ provides a function defined by the image screen coordinates of xs, ys.

If the regional area attribute information such as the weather condition information and the destination is described in the same coordinate system as the road map data, the image screen corresponding position and range of the regional area are varied depending upon the position of the viewpoint V and the direction of line of sight.

Hence, as is different from the display color mixing ratio w, the other additive color to be mixed with the color to be displayed denoted by $V_{CA}$ is determined at the step S201 of FIG. 2 at which the viewpoint and line of sight, and so forth are determined.

Figure 6:
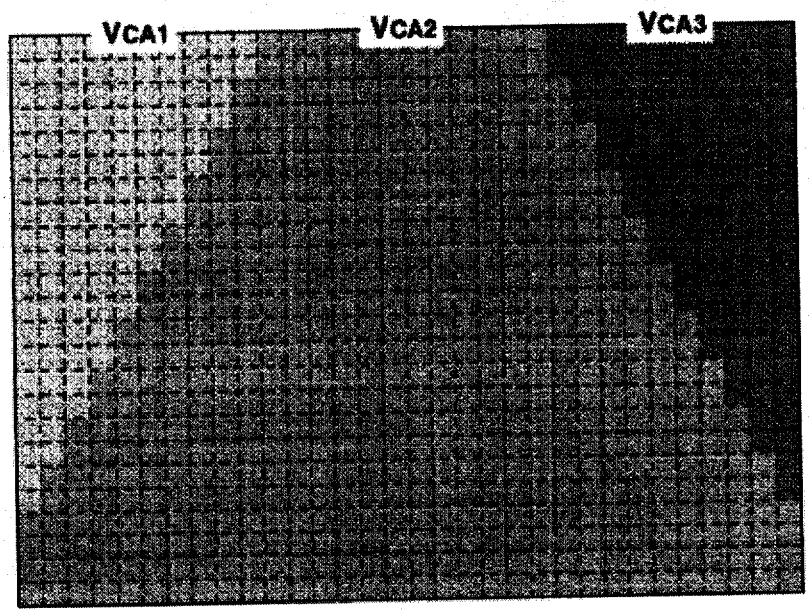
FIG. 6 is an explanatory view for explaining a storing pattern of other additive colors to be mixed with colors to be displayed stored in the display color mixing parameter storing table of the internal memory shown in FIG. 1.

If a displayed range on the displayed image screen is present for the received local area (regional area) attribute information, the other additive color to be mixed with the color to be displayed $V_{CA}$ previously determined according to the received attribute information is given to all pixels within the corresponding range of the image screen and is stored in the display color mixing parameter storing table 106, for example, in a pattern shown in FIG. 6.

Although it is possible to accurately derive the correspondence of the regional area given by the regional area attribute information to the displayed range on the image screen through the coordinate transformation (perspective projection transformation), with several patterns on divisions of the respective sheets of image screen previously determined (for example, FIG. 6 shows an example of one of the patterns in which the image screen is divided into three regions (right-handed portion (first region), a center portion (second region), and a left-handed portion (third region)), an appropriate pattern may be selected from the stored patterns according to the distance from the viewpoint to a center point of the regional area to which the regional area attribute information specifies (particularized by the regional area attribute information) to determine the value of $V_{CA}$.

As described above, when the routine shown in FIG. 2 goes to the step S204, the display color mixing parameters (the display color mixing ratio w and the other additive color to be mixed with the color to be displayed $V_{CA}$) are determined for the respective pixels of the image screen and are stored in the display color mixing parameter storing table 106.

(3) Processing of determinations of the display colors:

Referring back to FIG. 1, the image data output block 110 determines and outputs the display colors for the respective road map object data for which the coordinate transformations have been carried out.

The natural colors $V_{CO}$ are given to the respective road map data as the road map information and the displayed positions on the image screen are derived through the coordinate transformation.

Hence, the display color mixing ratio w and the other additive color to be mixed with the color to be mixed with the color to be displayed $V_{CA}$ are determined by referring to the display color mixing parameter storing table 106.

Thereafter, the display colors $V_{CD}$ can be derived in accordance with the equation (1).

It is noted that the application of the equation (1) may be carried out for the respective pixels constituting the road map data or alternatively only display colors on end points of the respective road map data may be calculated in accordance with the equation (1) and the display colors on the remaining points of the road map data may be derived through linear interpolation methods.

Furthermore, although the image data output block 110 determines the display colors $V_{CD}$ in accordance with the above-described equation (1) for all of the road map region object data for which the coordinate transformations are carried out, a corresponding natural color $V_{CO}$ for a road link data of the road map data may directly be displayed on the corresponding area of the road map data on the image screen, the road link data corresponding to an interval of a route at which a traffic congestion occurs in a case where such a traffic congestion (stagnation) information that the traffic congestion on the interval of route occurs is received from the various types of information receiving unit(s) 105.

Since the corresponding road link data with the natural color thereof are displayed with a relatively high saturation with respect to the surrounding displayed data, a force making a visual appeal to the user (viewer) can be increased.

In addition, for the data having a high symbolic characteristic and to which a direct information for the user is intended to be given such as character data representing names of places, the present position of the vehicle, and a recommended route of travel to the destination, the differentiation of the display color of the data having the high symbolic characteristic from the surrounding displayed content of the display data may be carried out without reflection of the atmospheric effect on the image screen so that an easily recognizable representation of the road map region object data in the form of the bird's eye view can be made.

Hence, the natural color for such data having the high symbolic characteristic as described above may be displayed without determination of the corresponding display color using the equation of (1).

The image output block 110 may determine the natural color $V_{CO}$ directly as the display color $V_{CD}$ without accordance with the equation (1) if necessary according to a particular attribute information to each road map previously set or according to the various types of external environment information of the various types of information receiving unit(s) 105.

Figure 7:
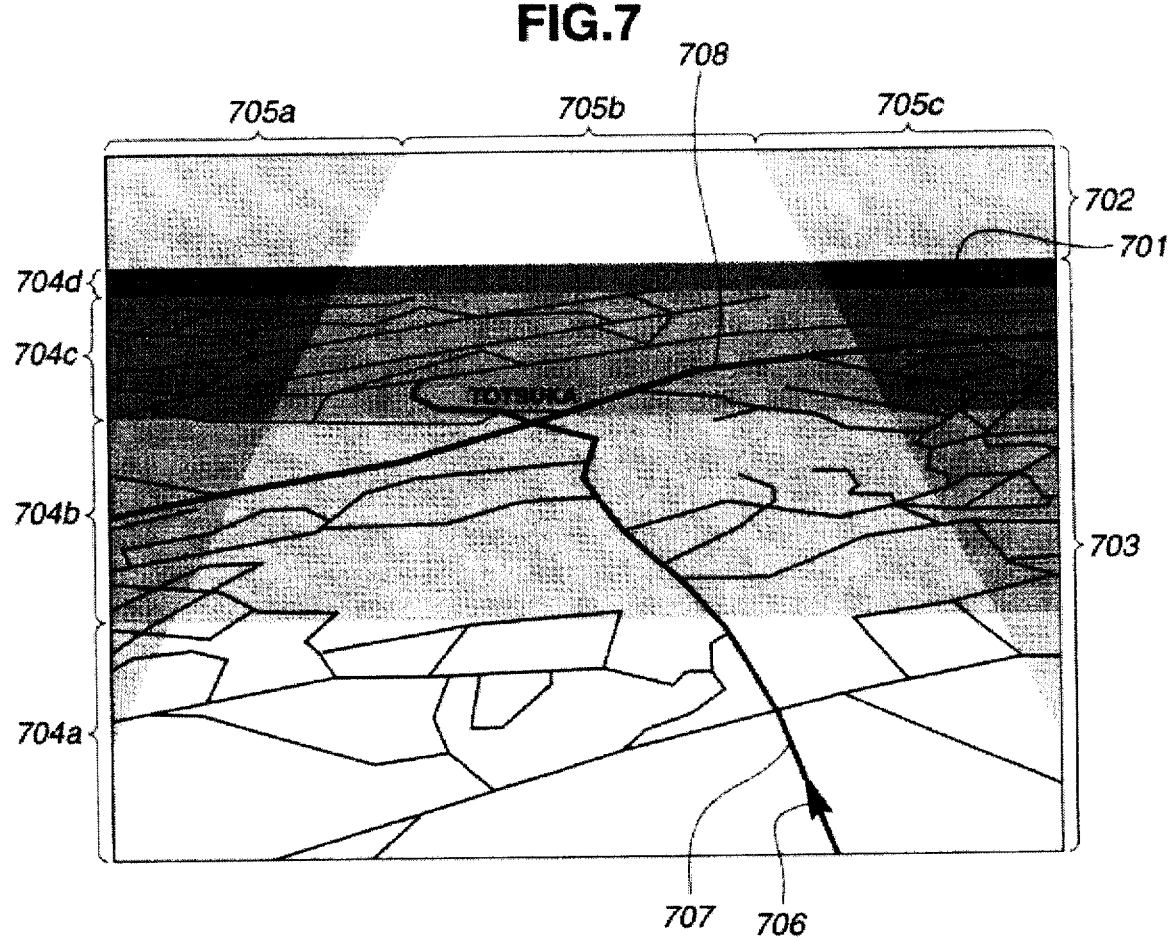
FIG. 7 is an explanatory view of an example of a bird's eye view displayed on the image screen of the image display unit achieved in the case of the first preferred embodiment.

FIG. 7 shows an example of the image screen on the image display unit 104 outputted from the arithmetic processing unit 103 after the above-described series of processing is carried out.

As shown in FIG. 7, the atmospheric effect is given to the road link data on some region and to a background color representing a ground surface and is displayed on the image screen of the image display unit 104. A part of the road link data is displayed without the atmospheric effect given thereto.

In FIG. 7, a line denoted by 701 represents a pseudo horizon on the displayed image screen.

A pseudo sky 702 whose display color is a color representing the sky is displayed on an upper end of the displayed image screen with the pseudo horizon 701 as a boundary.

In addition, a road map information displayed part 703 is displayed on the remaining part of the image screen except the pseudo sky 702 with the pseudo horizon 701 as the boundary, namely, a relatively low part of the image screen with the atmospheric effect represented on the remaining part of the image screen.

The road map data representing part 703 is displayed in such a way that as the displayed part of the image screen becomes advanced from a short-distance part (lower end part) to a long-distance part (remote from the short-distance part) when viewed from the user toward the image screen, the saturation of the image screen (or display brilliance (luminance)) is gradually reduced, as denoted by 704a, 704b, 704c, and 704d of FIG. 7. Thus, the atmospheric effect can be represented.

In addition, since a brighter color painted on the region 705b corresponding to the direction toward which the destination set by the user is present and dark colors are painted on the other regions 705a and 705c, the destination can be represented visually and efficiently with avoidance of a complicated display color representation.

Furthermore, in a case where the road map data indicates the information requiring an assurance of a high visibility such as the character data representing the names of places, the present position of the vehicle, and the route of travel to the set destination (for example, the character data of "Totsuka ()" (name of place), the mark 706 representing the present position of the vehicle, the route of travel to the set destination 707, a trunk road 708 which is in the traffic congestion shown in FIG. 7), the natural color $V_{CO}$ is directly determined as the display color.

Hence, the information requiring the assurance of the high visibility can be displayed in a visually efficient manner.

In addition, as compared with the other information which is a fade-out representation at the long-distance part due to the atmospheric effect, the above-described information is displayed in the same color as the natural color (the saturation of the natural color) so as to relatively easily be viewed. It has an advantage such that a complicated representation of the display can be relieved.

It is noted that although, in the first embodiment, the image output block 110 determines and outputs the display colors for the individual road map data according to the equation (1), for example, with one sheet of the image screen displayed in the natural color only for the road map information which performs the atmospheric effect prepared, the equation (1) may be applied to the respective pixels corresponding to the prepared sheet of the image screen, the display color mixing ratio table within the display color mixing parameter storing table 106 and the table on the other color to be mixed with the color to be displayed within the display color mixing parameter storing table 106 to generate the atmospheric effect representation image screen and, finally, the road map data with no atmospheric effect may be overwritten (substituted) onto the generated atmospheric effect representation image screen.

Figure 8:
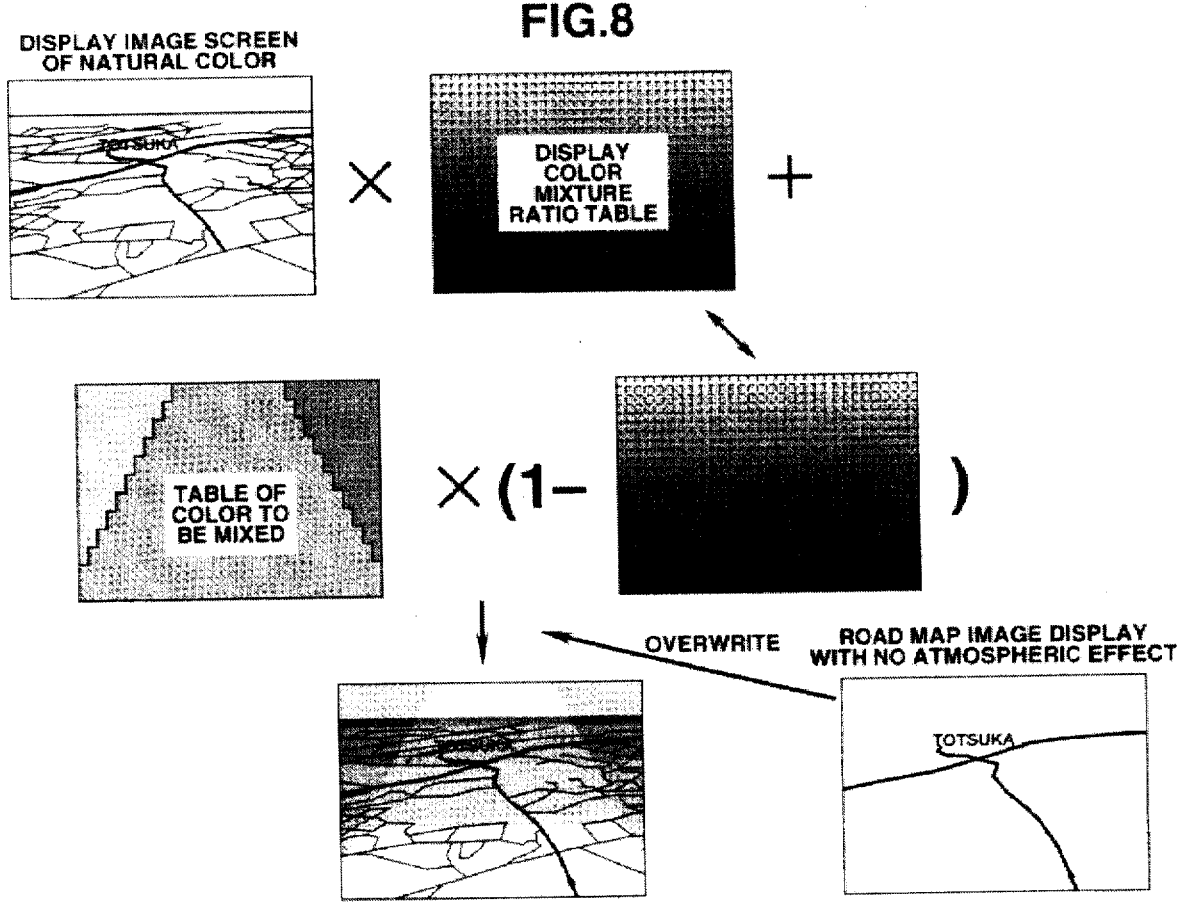
FIG. 8 is an explanatory view for explaining another method for determining the display colors for the data of the objects to be displayed in a case of a second preferred embodiment of the navigating apparatus according to the present invention.

FIG. 8 shows a generation-pattern of the alternative road map image representation method described above as a second preferred embodiment of the navigating apparatus according to the present invention.

As shown in FIG. 8, one sheet of the image screen prepared with the objects to be displayed in the natural colors is multiplied by the display color mixing ratio (w) table and is added to the other additive color ($V_{CA}$) table multiplied by (1—display color mixing ratio (w) table). The result of the above-desribed drawing operation is overwritten with the object (character data of the name of place, Totsuka, the mark representing the present position, the route of travel to the destination, and a trunk road in the traffic congestion, in this case) with no atmospehric effect so that the image display unit 104 displays the image shown in a center part of FIG. 8. The structure of the second embodiment of the navigating apparatus is generally the same as shown in FIG. 1. It is noted that exp in each equation of (4) and (6) denotes the exponential function.

TABLE 1

$$\begin{pmatrix} C_{RD} \\ C_{GD} \\ C_{BD} \end{pmatrix} = w \begin{pmatrix} C_{RO} \\ C_{GO} \\ C_{BO} \end{pmatrix} + (1-w) \begin{pmatrix} C_{RA} \\ C_{GA} \\ C_{BA} \end{pmatrix} \quad (1)$$

TABLE 1-continued $$d = d(ys) = \frac{h}{\sin\left(\theta - \tan^{-1}\left(\frac{ys}{Dy}\tan\beta\right)\right)} \quad (2)$$

$$dn = d(-Dy) = \frac{h}{\sin(\theta + \beta)} \quad (3)$$

$$w = w(d(ys)) = \exp(-a(d(ys) - dn)), -Dy \leq ys \leq Dy \quad (4)$$

$$dc = d(-yc) = \frac{h}{\sin\left(\theta + \tan^{-1}\left(\frac{yc}{Dy}\tan\beta\right)\right)} \quad (5)$$

$$w = w(d(ys)) = \begin{cases} 1 & , -Dy \leq ys \leq -yc \\ \exp(-a(d(ys) - dc)) & , -yc \leq ys \leq Dy \end{cases} \quad (6)$$

What is claimed is:

1. An apparatus for navigating a mobile body, comprising:

a) an external memory unit arranged for storing road map information on each of a plurality of road map pieces;

b) a display reference point determining unit arranged for determining a display reference point on the basis of which a region in pieces of the road map stored in the external memory unit is determined to be displayed on an image screen;

c) an arithmetic processing unit arranged for carrying out an arithmetic operation and processing required to display any pieces of the road map which corresponds to the region determined to be displayed on the image screen in a form of a bird's eye view; and d) an image display unit arranged for displaying the region in pieces of the road map stored in the external memory unit to be determined to be displayed on the image screen thereof in the form of the bird's eye view, wherein said arithmetic operation and processing unit comprises:

e) first determining means for determining the region in pieces of the road map stored in the external memory unit to be displayed on the image screen on the basis of the determined display reference point and for determining coordinate transformation parameters to be used for a perspective projection transformation of the region of pieces of the road map into the bird's eye view on the basis of the determined display reference point;

f) road map data inputting means for reading the road map information of the region of pieces of the road map to be displayed from the external memory unit into said arithmetic processing unit;

g) coordinate transforming means for carrying out the perspective projection coordinate transformation for the road map information on the corresponding region to be displayed using the coordinate transformation parameters determined by said first determining means;

h) internal memory means for storing mixing ratios (w) of colors to be displayed with other additive colors and the other additive colors ($V_{CA}$) to be mixed with the colors to be displayed for individual pixels constituting the displayed image screen on said image display unit, said mixing ratios (w) and the other additive colors ($V_{CA}$) being parameters to vary display colors of data of objects in said road map information of the corresponding region of the road map according to distances from a viewpoint of the bird's eye view to the respective objects to be displayed;

i) second determining means for determining the respective display colors for the respective data of objects in said road map information on the corresponding region of the road maps to be displayed on the image screen of said image display unit after the perspective projection coordinate transformation using the display color mixing ratios (w) and the other additive colors ($V_{CA}$) to be mixed with the colors to be displayed; and j) display color outputting means for outputting the respective display colors for the respective data of the objects in the region of the road map to be displayed on the image screen of said display unit determined by said second determining means to the image display unit together with the coordinate transformed road map information of the corresponding region of the road map to be displayed.

2. An apparatus for navigating a mobile body as claimed in claim 1, which further comprises external environment information inputting means for inputting a dynamic external environmental information from external infrastructure facilities which are external to the mobile body and wherein said image display unit displays the road map information of the corresponding region of the road map in the form of the bird's eye view together with the dynamic external environmental information.

3. An apparatus for navigating a mobile body as claimed in claim 2, wherein the dynamic external environmental information includes a weather condition information and a traffic congestion information.

4. An apparatus for navigating a mobile body as claimed in claim 1, wherein said image screen of said image display unit is approximately divided into two display parts of a relatively upper part and a relatively low part and wherein said display color outputting means outputs the respective data of the objects in said road map information of the corresponding region of the road map to be displayed to the image display unit with determined display colors by said second determining means to said image display unit so that said display unit displays the outputted data with determined display colors only on a predetermined range of the relatively low part as viewed from a user toward the image screen thereof and wherein said second determining means determines a color representing a sky as the corresponding display color to be displayed on the relatively upper part as viewed from the user toward the image screen of said image display unit and said display color outputting means outputs the color representing the sky to said image display unit.

5. An apparatus for navigating a mobile body as claimed in claim 4, wherein said second determining means mixes natural colors ($V_{CO}$) set as the display colors for the respective data of the objects in the road map information of the corresponding region of the road map data or a natural color previously set as a display color representing said sky with the additive colors ($V_{CA}$) to be mixed with the colors to be displayed which are previously stored in said memory means on the basis of respectively corresponding mixing ratios of the colors to be displayed to the other additive colors so as to determine the display colors for the data of the objects in said road map information to be displayed or so as to determine the display color of the sky.

6. An apparatus for navigating a mobile body as claimed in claim 5, wherein each of the display colors of the data of the objects in said road map information of the corresponding one of the road map data is determined as follows:

$$\begin{pmatrix} C_{RD} \\ C_{GD} \\ C_{BD} \end{pmatrix} = w \begin{pmatrix} C_{RO} \\ C_{GO} \\ C_{BO} \end{pmatrix} + (1-w) \begin{pmatrix} C_{RA} \\ C_{GA} \\ C_{BA} \end{pmatrix} \text{ wherein } V_{CD} = \begin{bmatrix} C_{RD} \\ C_{GD} \\ C_{BD} \end{bmatrix}$$

denotes each of the determined display colors, w denotes each display color mixing ratio and indicates a real number value ranging from zero to one depending on the corresponding distance, $$V_{CA} = \begin{bmatrix} C_{RA} \\ C_{GA} \\ C_{BA} \end{bmatrix}$$

denotes each of the other additive colors to be mixed with $V_{CO}$, R denotes a red component of three primaries, G denotes a green component of the three primaries, and B denotes a blue component of the three primaries.

7. An apparatus for navigating a mobile body as claimed in claim 5, wherein said second determining means comprises generating means for previously generating a display image of the natural colors in units of the pixels and mixing means for mixing the natural colors with the other additive colors for the respective pixels on the display image according to the display color mixing ratios corresponding to the respective pixels and stored in said memory means.

8. An apparatus for navigating a mobile body as claimed in claim 7, which further comprises external environment information inputting means for inputting a dynamic external environmental information from external infrastructure facilities which are external to the mobile body and wherein said image display unit displays the road map data in the form of the bird's eye view together with the dynamic external environmental information and wherein said second determining means determines the natural colors of the respective data of the objects set in the road map information as the display colors of the data to be displayed directly as their display colors if either a previously set condition or a condition determined according to the external environmental information inputted by said external environmental information inputting means is satisfied when determining the display colors of the data of the objects in said road map information to be displayed on the image screen of said image display unit.

9. An apparatus for navigating a mobile body as claimed in claim 8, wherein the previously set condition to be satisfied includes such a condition as to determine whether the data of the objects in said road map information to be displayed indicates such an information as requiring an assurance of a relatively high visibility against any other data to be displayed.

10. An apparatus for navigating a mobile body as claimed in claim 9, wherein the information requiring the assurance of the relatively high visibility includes character data representing names of places, a present position of the mobile body derived from said display reference point determining units, and a route of travel to a destination to which the mobile body is finally to reach and which is set by the user.

11. An apparatus for navigating a mobile body as claimed in claim 8, wherein the condition determined according to the external environmental information inputted by said external environmental information inputting means to be satisfied includes such a condition as to determine whether the data of the objects in said road map information of the corresponding region to be displayed indicate road link data corresponding to a road interval on which a traffic congestion presently occurs when the external environmental information is the traffic congestion information.

12. An apparatus for navigating a mobile body as claimed in claim 8, wherein each of the display color mixing ratios is previously set in said memory means on the basis of a distance from a point of place on a road map plane corresponding to an individual pixel on the image screen of said image display unit to a viewpoint of the bird's eye view.

13. An apparatus for navigating a mobile body as claimed in claim 8, wherein each of the display color mixing ratios is calculated on the basis of a distance from a point of place on a road map plane corresponding to an individual pixel on the image screen of said image display unit to a viewpoint of the bird's eye view.

14. An apparatus for navigating a mobile body as claimed in claim 12, wherein one of the display color mixing ratios for at least one particular pixel on the image screen of said image display unit is previously set in said memory means irrespective of the distance form the point on the map plane corresponding to the particular pixel to the viewpoint of the bird's eye view.

15. An apparatus for navigating a mobile body as claimed in claim 13, wherein one of the display color mixing ratios for at least one particular pixel on the image screen of said image display unit is calculated irrespective of the distance form the point on the map plane corresponding to the particular pixel to the viewpoint of the bird's eye view.

16. An apparatus for navigating a mobile body as claimed in claim 8, wherein said image screen of said image display unit is divided into a plurality of display regions on the basis of either a previously given information to said arithmetic processing unit or the external environment information inputted by said external environmental information inputting means and wherein the other additive colors $V_{CA}$ to be mixed with the colors to be displayed are colors mutually different for the respective divided display regions.

17. An apparatus for navigating a mobile body as claimed in claim 16, wherein said mutually different colors given to the respectively divided display regions on the basis of the previously given information are such that a relatively bright color is given to any one of the divided display regions corresponding to a direction of a destination to which the mobile body is finally to reach and which is set by the user and a relatively dark color is given to any other of the divided display regions.

18. An apparatus for navigating a mobile body as claimed in claim 16, wherein the mutually different colors given to the respectively divided display regions of the image screen of said image display unit on the basis of the external environmental information are such that in the divided display regions of the image screen of said image display unit, at least one color directly representing the present weather condition information is given to a range of the image screen of said image display unit corresponding to any regional area of a certain weather environment.

19. An apparatus for navigating a mobile body as claimed in claim 18, wherein the present weather condition information includes an information on a photo-chemical smog alert.

20. A method for navigating a mobile body using an image display unit comprising the steps of:

a) storing road map information on each of a plurality of road map pieces;

b) determining a display reference point on the basis of which a region in pieces of the road map stored at said step a) is determined to be displayed on an image screen of said image display unit;

c) carrying out an arithmetic operation and process required to display any pieces of the road map which corresponds to the region determined to be displayed on the image screen in a form of a bird's eye view; and d) displaying the region in pieces of the road map stored at said step a) to be determined to be displayed on the image screen of said image display unit in the form of the bird's eye view, wherein said step c) further comprises the steps of:

e) determining the region in pieces of the road map stored at said step a) to be displayed on the image screen on the basis of the determined display reference point and determining coordinate transformation parameters to be used for a perspective projection transformation of the region of pieces of the road map into the bird's eye view on the basis of the determined display reference point;

f) reading the road map information of the region of pieces of the road map to be displayed;

g) carrying out the perspective projection coordinate transformation for the road map information on the region to be displayed using the coordinate transformation parameters determined at said step e);

h) storing mixing ratios (w) of colors to be displayed with other additive colors and the other additive colors ($V_{CA}$) to be mixed with the colors to be displayed for individual pixels constituting the displayed image screen on said image display unit, said mixing ratios (w) and the other additive colors ($V_{CA}$) being parameters to vary display colors of data of objects in said road map information of the corresponding region of the road map according to distances from a viewpoint of the bird's eye view to the respective objects to be displayed;

i) determining the respective display colors for the respective data of the objects in said road map information on the corresponding region of the road map to be displayed on the image screen of said image display unit after the perspective projection coordinate transformation using the display color mixing ratios (w) and the other additive colors ($V_{CA}$) to be mixed with the colors to be displayed; and j) outputting the respective display colors for the respective data of the objects in the corresponding region of the road map to be displayed on the image screen of said display unit determined at said step e) to the image display unit together with the coordinate transformed road map information of the corresponding region of the road map to be displayed.

* * * * *